(12) United States Patent
Chou et al.

(10) Patent No.: US 8,130,319 B2
(45) Date of Patent: Mar. 6, 2012

(54) SIGNAL PROCESSING DEVICE AND METHOD

(75) Inventors: Shu-Hsien Chou, Tainan (TW); Cheng-Yu Hsieh, Tainan (TW)

(73) Assignee: Himax Media Solutions, Inc. (TW)

( * ) Notice: Subject to any disclaimer, the term of this patent is extended or adjusted under 35 U.S.C. 154(b) by 641 days.

(21) Appl. No.: 12/326,801

(22) Filed: Dec. 2, 2008

(65) Prior Publication Data

US 2010/0134683 A1 Jun. 3, 2010

(51) Int. Cl.
*H04N 7/00* (2011.01)
*H04N 11/00* (2006.01)
*H04N 9/64* (2006.01)

(52) U.S. Cl. ........ 348/468; 348/464; 348/466; 348/478; 348/716; 348/718

(58) Field of Classification Search .................. 348/464, 348/466, 468, 478, 716, 718
See application file for complete search history.

(56) References Cited

U.S. PATENT DOCUMENTS

| | | | | |
|---|---|---|---|---|
| 5,469,091 A * | 11/1995 | Takahashi et al. | | 327/73 |
| 5,555,025 A * | 9/1996 | McArthur | | 348/478 |
| 5,684,542 A * | 11/1997 | Tsukagoshi | | 348/468 |
| 5,777,684 A * | 7/1998 | Gyarmati et al. | | 348/468 |
| 5,835,153 A * | 11/1998 | Pratt et al. | | 348/468 |
| 5,847,770 A * | 12/1998 | Yagasaki | | 348/563 |
| 5,907,366 A * | 5/1999 | Farmer et al. | | 348/478 |
| 5,999,225 A * | 12/1999 | Yagasaki et al. | | 348/564 |
| 6,072,532 A * | 6/2000 | Chieh et al. | | 348/478 |
| 6,115,077 A * | 9/2000 | Tsukagoshi | | 348/607 |
| 6,377,308 B1 * | 4/2002 | Cahill, III | | 348/461 |
| 6,415,100 B1 * | 7/2002 | Park | | 386/244 |
| 6,424,792 B1 * | 7/2002 | Tsukagoshi et al. | | 386/243 |
| 6,784,943 B1 * | 8/2004 | Tults | | 348/465 |
| 7,173,667 B2 * | 2/2007 | Oh | | 348/468 |
| 7,391,471 B1 * | 6/2008 | Cucinotta | | 348/473 |
| 2004/0227853 A1 * | 11/2004 | Oh | | 348/468 |
| 2005/0212969 A1 * | 9/2005 | Chen | | 348/569 |
| 2005/0243210 A1 * | 11/2005 | Lee | | 348/564 |
| 2006/0098948 A1 * | 5/2006 | Liao et al. | | 386/98 |
| 2006/0248030 A1 * | 11/2006 | Raynor et al. | | 706/20 |
| 2007/0143818 A1 * | 6/2007 | Mashiko | | 725/136 |
| 2007/0252902 A1 * | 11/2007 | Lin et al. | | 348/231.4 |
| 2008/0002056 A1 * | 1/2008 | Chang et al. | | 348/465 |
| 2008/0030616 A1 * | 2/2008 | Huang | | 348/468 |
| 2008/0062313 A1 * | 3/2008 | You | | 348/468 |
| 2008/0292272 A1 * | 11/2008 | Yamazaki et al. | | 386/95 |
| 2009/0086096 A1 * | 4/2009 | Singh et al. | | 348/478 |
| 2010/0128175 A1 * | 5/2010 | Lin et al. | | 348/466 |
| 2010/0177243 A1 * | 7/2010 | Park | | 348/468 |

* cited by examiner

*Primary Examiner* — Brian Yenke
(74) *Attorney, Agent, or Firm* — Baker & McKenzie LLP

(57) ABSTRACT

A signal processing device with high efficiency of teletext information processing is provided. The signal processing device is configured to receive and encode a transport stream for display, wherein the transport stream provides teletext information associated with a plurality of teletext lines and video information associated with a plurality of video lines. The video signal processing device includes a memory configured to store line enable signals and line data associated with the teletext lines and the video lines, a VBI controller coupled to the memory, configured to read the memory to obtain the line data associated with enabled teletext lines of the teletext lines, and an TV encoder coupled to the VBI controller, configured to receive and encode the line data associated with the enabled teletext lines for display.

19 Claims, 4 Drawing Sheets

| Line Number | Memory Address | LES First Byte | LD Other 47 Bytes |
|---|---|---|---|
| 0 | X | | |
| 1 | X | | |
| 2 | X | | |
| 3 | X | | |
| 4 | X | | |
| 5 | 0 | 0 | D |
| 6 | 1 | 1 | D |
| 7 | 2 | 0 | D |
| 8 | 3 | 1 | D |
| ⋮ | ⋮ | ⋮ | ⋮ |
| 22 | 17 | 1 | D |
| ⋮ | ⋮ | ⋮ | ⋮ |
| 314 | 309 | ⋮ | ⋮ |
| 315 | 310 | ⋮ | ⋮ |
| 316 | 311 | ⋮ | ⋮ |
| 317 | 312 | 1 | D |
| 318 | 313 | 1 | D |
| ⋮ | ⋮ | ⋮ | ⋮ |
| 334 | 329 | 1 | D |
| 335 | 330 | ⋮ | ⋮ |
| 336 | 331 | ⋮ | ⋮ |
| ⋮ | ⋮ | ⋮ | ⋮ |
| 621 | 616 | ⋮ | ⋮ |
| 622 | 617 | ⋮ | ⋮ |
| 623 | X | | |
| 624 | X | | |

Lines 5–22: LD_TT
Lines (around 23–316): LD_VIDEO
Lines 317–334: LD_TT
Lines 335–622: LD_VIDEO

FIG. 3A

| Line Number | Memory Address | LES First Byte | LD Other 47 Bytes |
|---|---|---|---|
| 0 | x | | |
| 1 | x | | |
| 2 | x | | |
| 3 | x | | |
| 4 | x | | |
| 5 | 0 | 0 | D |
| 6 | 1 | 1 | D |
| 7 | 2 | 0 | D |
| 8 | 3 | 1 | D |
| ⋮ | ⋮ | ⋮ | ⋮ |
| 25 | 20 | 1 | D |
| ⋮ | ⋮ | ⋮ | ⋮ |
| 314 | 309 | ⋮ | ⋮ |
| 315 | 310 | 1 | D |
| 316 | 311 | 1 | D |
| 317 | 312 | 1 | D |
| 318 | 313 | 0 | D |
| ⋮ | ⋮ | ⋮ | ⋮ |
| ⋮ | ⋮ | ⋮ | ⋮ |
| 334 | 329 | 1 | D |
| 335 | 330 | 1 | D |
| 336 | 331 | ⋮ | ⋮ |
| ⋮ | ⋮ | ⋮ | ⋮ |
| 621 | 616 | ⋮ | ⋮ |
| 622 | 617 | ⋮ | ⋮ |
| 623 | x | | |
| 624 | x | | |

LD_TT: lines 5–25
LD_VIDEO: lines ~26–314
LD_TT: lines 315–335
LD_VIDEO: lines 336–622

FIG. 3B

SIGNAL PROCESSING DEVICE AND METHOD

BACKGROUND

1. Technical Field

The embodiments described herein relate to the field of video processing and more particularly to techniques on teletext information processing.

2. Description of the Related Art

Signals transmitted to television sets and many other display devices to generate displays typically include a vertical blanking interval (VBI). The VBI is the time between the last line of a frame and the beginning of the next frame. Often a portion of the VBI is used by television broadcasters to transmit control information necessary for displaying video information. This control information includes, for example, video synchronization signals. In addition, a portion of the VBI is typically reserved for broadcasting the text for closed captioning for the hearing impaired. Broadcasters also may use time within the VBI to broadcast a variety of other types of data, typically referred to as teletext, of the broadcaster's own choosing.

Teletext consists of information such as news, sports, and financial information. For instance, teletext broadcasts the latest stock prices, also recipes, entertainment listings, advertisements, movie schedules and reviews, music and TV program reviews, additional information on various TV programs, and more. Teletext also broadcasts subtitles (closed captions) for various programs, and news bulletins that are overlaid on top of the TV picture.

The total number of the frame lines is 525 for the National Television Standards Committee (NTSC) standard and 625 for Phase Alternating Line (PAL) standard. The line numbers of the teletext lines, for example, are set to be 5-22 or 317-334 alternated with the fields for the PAL standard (the line number is from 0 to 624), and 8-25 or 270-287 alternated with the fields for the NTSC standard (the line number is from 0-524).

FIG. 1 is a block diagram of a conventional video signal processing device 100 such as a conventional television set for receiving a television signal '$S_{TV}$' and converting it for display. The television signal '$S_{TV}$' comprises teletext information and video information. The teletext information and the video information are associated with a plurality of teletext lines and a plurality of video lines among a plurality of frame lines, respectively. Each teletext line comprises line enable signal 'LES' and teletext line data. Specifically, the line enable signal 'LES' records whether the teletext line is enabled or disabled and the teletext line data records a display data value of the teletext line. On the other hand, each video line comprises video line data. And specifically, the video line data records respective display data values associated with the video lines.

A receiver 110 receives the television signal '$S_{TV}$', demodulates it into a transport stream 'TS', and then provides the transport stream to an extractor 120. The extractor 120, typically implemented as software, extracts the line enable signal 'LES' and line data information associated with all the frame lines from the transport stream TS. The extractor 120 then sends the line enable signal 'LES' to a plurality of registers 142 inside a VBI controller 140, wherein each of the registers 142 is dedicated to store the line enable signal 'LES' associated with a respective one of the teletext lines. Also, the extractor 120 provides line data 'LD' to a memory 130. The line data 'LD' comprises the teletext line data associated with the teletext lines (teletext line data 'LD_TT') and the video line data associated with the video lines (video line data 'LD_VIDEO').

The VBI controller 140 then reads the line enable signal 'LES' stored in the registers 140 to detect which teletext line is enabled. The VBI controller 140 reads from the memory 130 enabled teletext line data 'LD_TTE' associated with enabled teletext lines of the teletext lines and provides it to a TV encoder 160. A video controller 150 reads the video line data 'LD_VIDEO' associated with all of the video lines from the memory 130 and also provides it to the TV encoder 160. The TV encoder 160 then encodes the received line data 'LD_TTE' and 'LD_VIDEO' and provides the encoded data to the display 170 for display.

The total number of registers 142 is equal to that of the number of teletext lines. As high as 36 registers are required in the PAL or NTSC standard. Manipulation of such a great total number of the registers 142 causes the VBI controller 140 to have a heavy load and hence a large latency, especially during field transitions. Moreover, the fixed/disposed registers 142 restrict not only the total number but also the respective numbers of the teletext lines that can be used for teletext information transmission (e.g., always 5-22 or 317-334 for the PAL standard). Accordingly this leads to low information transmission flexibility, and adaptability.

SUMMARY

A signal processing device and a signal processing method with higher teletext information processing efficiency and enhanced teletext information transmission flexibility and adaptability are described herein.

A signal processing device with high teletext information processing efficiency is provided. According to one aspect, a signal processing device can be configured to receive and encode a transport stream for display. The transport stream can provide teletext information and video information. The signal processing device can comprise a memory configured to store line enable signals and line data associated with the teletext lines and the video lines, a VBI (vertical blanking interval) controller coupled to the memory, configured to read the memory to obtain the line data associated with enabled teletext lines of the teletext lines. Further, a video controller can be configured to read the memory and obtain the line data associated with the video lines. Moreover, an encoder can be configured to receive and encode the line data associated with the enabled teletext lines and the video lines for display. The memory can comprise a plurality of memory addresses the total number of which is equal to the total number of the teletext lines and the video lines in a frame. Additionally, the memory may have memory addresses as many as the total lines of a frame. Each memory address can correspond to one frame line number with one portion storing the line enable signal and the other portion storing the line data. The VBI controller can read the memory sequentially to provide the line data associated with the enabled teletext lines sequentially to the encoder.

These and other features, aspects, and embodiments are described below in the section entitled "Detailed Description."

BRIEF DESCRIPTION OF THE DRAWINGS

Features, aspects, and embodiments are described in conjunction with the attached drawings, in which:

FIGS. 3A and 3B are tables summarizing data storage arrangement in a memory of the video signal processing device of FIG. 2 in case of the PAL standard in accordance with various embodiments described herein.

DETAILED DESCRIPTION

Figure 1:
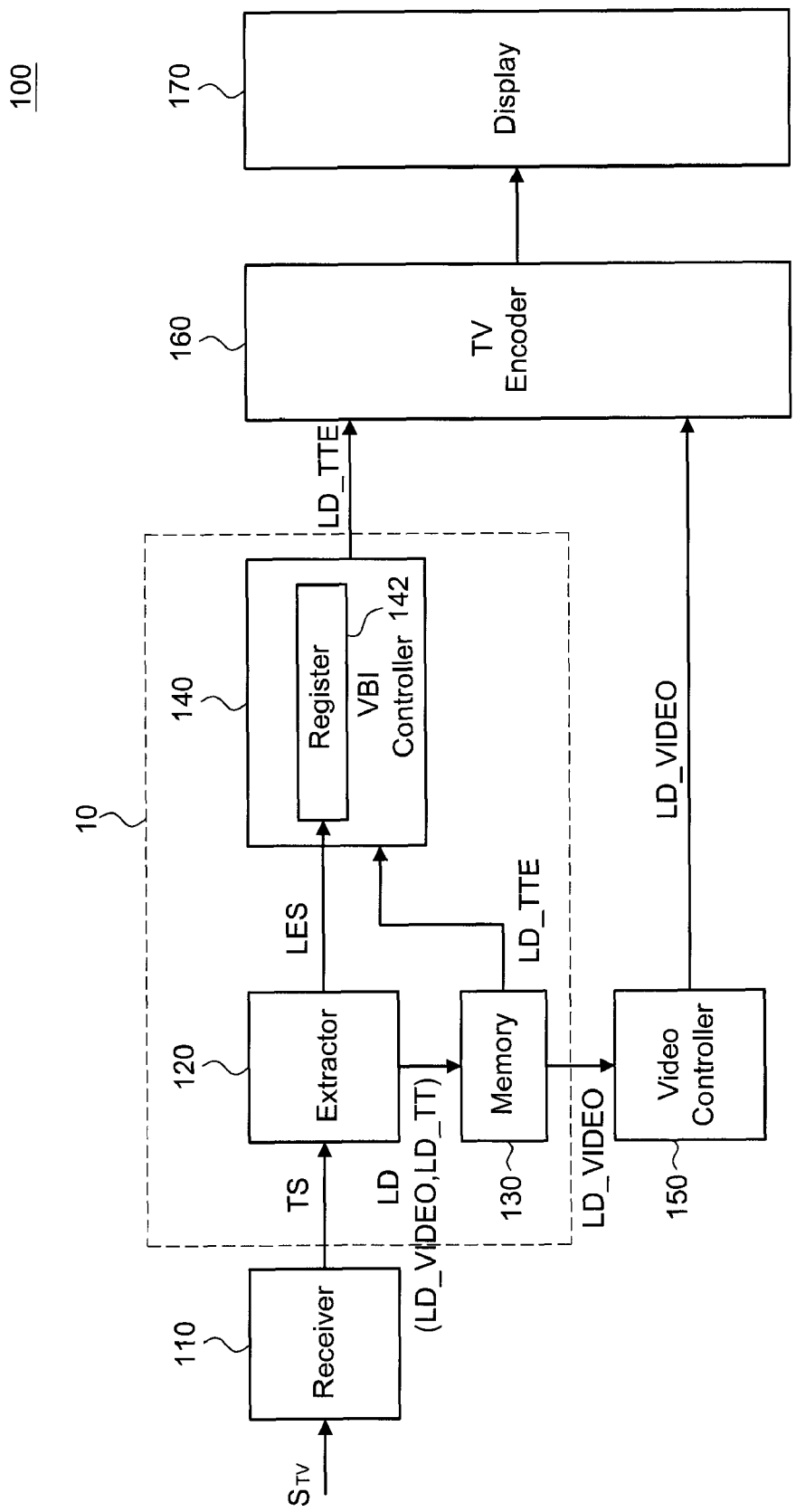
FIG. 1 is a block diagram of a conventional video signal processing device.
Figure 2:
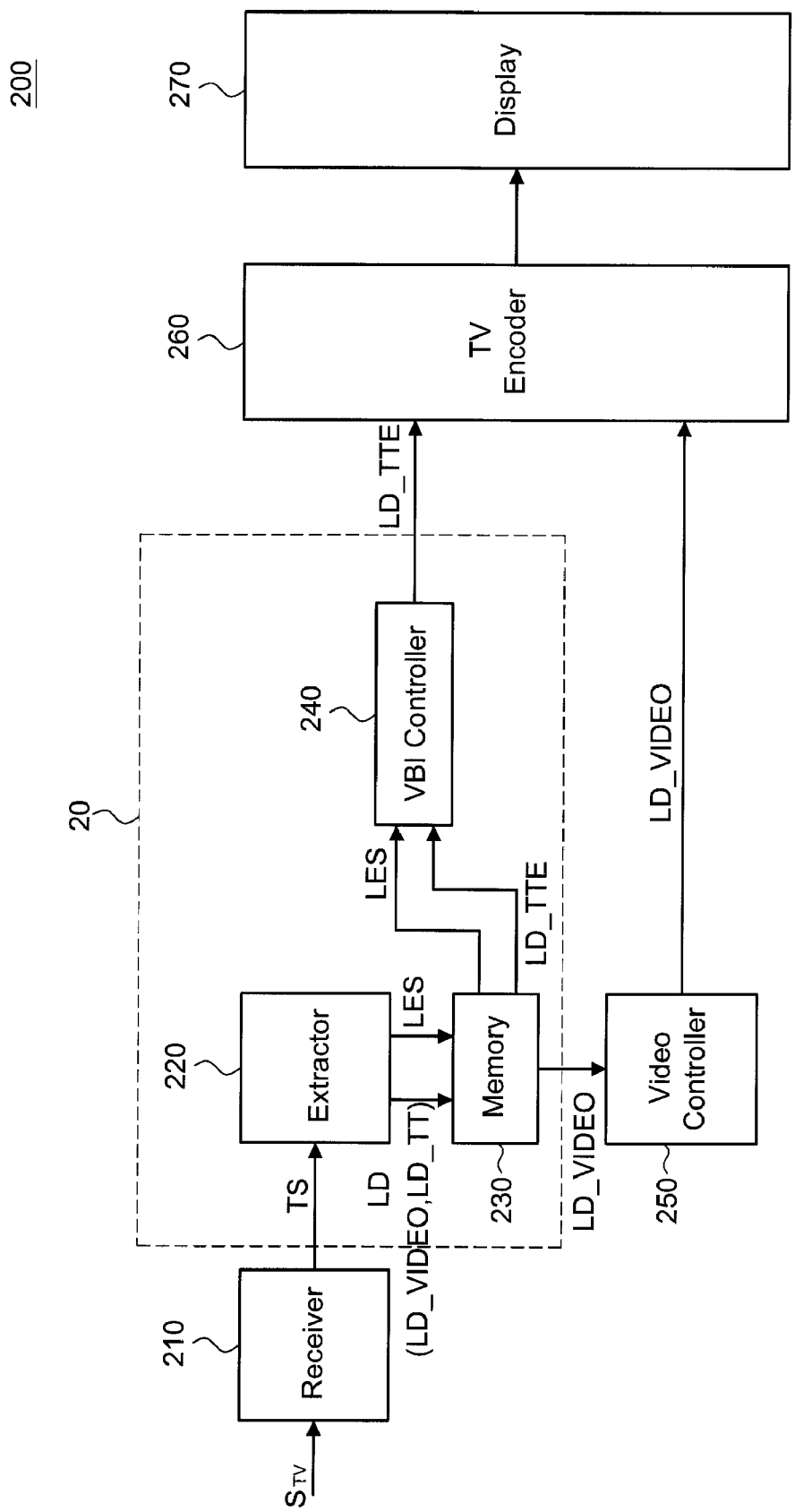
FIG. 2 is a block diagram of a video signal processing device in accordance with one embodiment herein.

FIG. 2 is a block diagram of a video signal processing device in accordance with one embodiment. As shown, the video signal processing device 200, for example, a television set, can comprise a receiver 210, an extractor 220, a memory 230, a VBI controller 240, a video controller 250, a TV encoder 260, and a display 270.

The receiver 210 can receive a television signal '$S_{TV}$' from e.g., an antenna, a satellite dish, or a cable television jack (not shown). The television signal '$S_{TV}$', for example, may conform to a well-know television format, such as National Television Standards Committee (NTSC) or Phase Alternating Line (PAL). Additionally, the television signal '$S_{TV}$' comprises teletext information and video information. The teletext information and the video information are associated with a plurality of teletext lines and a plurality of video lines among a plurality of frame lines, respectively. The total number of the frame lines, may be 525 for the NTSC standard, and 625 for the PAL standard.

Each teletext line comprises line enable signal 'LES' and teletext line data 'LD_TT'. Specifically, the line enable signal 'LES' records whether the teletext line is enabled or disabled, and the teletext line data 'LD_TT' can record a display data value of the teletext line. On the other hand, each video line can comprise video line data 'LD_VIDEO' associated with the video lines, and specifically, the video line data 'LD_VIDEO' can record data values associated with the video lines.

The respective numbers of the teletext lines may be in a range of 5-22 or 317-334 alternated with the fields for the PAL-format television signal '$S_{TV}$', or 8-25 or 270-287 alternated with the fields for the NTSC standard, and the respective number of the video lines may be the other frame line numbers than the teletext line numbers. However, the teletext line numbers may also have a different and even broader range, as is detailed in connection with FIG. 3.

The receiver 210 can be configured to receive the television signal '$S_{TV}$', demodulate it into a transport stream 'TS', and then provides the transport stream 'TS' to the extractor 220. The receiver 210, for example, can comprise a tuner (not shown) for tuning in a desired channel to receive the television signal '$S_{TV}$' while blocking or filtering signals on unwanted channels, and a demodulator (not shown) for demodulating the television signal '$S_{TV}$' into the transport stream 'TS' and providing the transport stream 'TS' to the extractor 220.

The extractor 220, which may be implemented as software, can be configured to extract from the transport stream 'TS' the line enable signals 'LES' and the line data 'LD' associated with all of the frame lines, wherein the line data 'LD' includes both the teletext line data 'LD_TT' and the video line data 'LD_VIDEO'. The extractor 220 can then send both line enable signal 'LES' and line data 'LD' associated with all the frame lines to the memory 230.

The VBI controller 240 can be configured to read the line enable signal 'LES' stored in the memory 230 and then detect which teletext line is enabled. Then the VBI controller 240 can read from the memory 230 the enabled teletext line data 'LD_TTE' associated with only the teletext lines that are enabled to provide the line data 'LD_TTE' to the TV encoder 260.

The Video controller 250 reads the video line data 'LD_VIDEO' from the memory 230 and then provides it to the TV encoder 260.

The TV encoder 260 can be configured to encode the line data LD associated with the enabled teletext line data 'LD_TTE' and the video line data 'LD_VIDEO' respectively received from the VBI controller 240 and the video controller 250 to process them for suitable display on the display 270 (e.g. a computer monitor or a display in a television set).

The video signal processing devices 100 and 200 differ mainly in blocks 10 and 20. Specifically, the extractor 120 can provide the line enable signal 'LES' and the line data 'LD' respectively to the registers 142 and the memory 130 in block 10, while the extractor 220 can provide both the line enable signal 'LES' and the line data 'LD' to the memory 230 in block 20. As such, the VBI controller 140 can then read the line enable signal 'LES' stored in the registers 142 to acquire from the memory 130 the enabled teletext line data 'LD_TTE' in block 10, while the VBI controller 240 checks the line enable signal 'LES' stored in the memory 230 to read the enabled teletext line data 'LD_TTE' from the memory 230 in block 20. Advantageously, no extra registers are required for storing the line enable signal 'LES' in the novel video processing device 200. Consequently, no large loading and latency are induced, and higher teletext information processing efficiency is accordingly achieved.

FIGS. 3A and 3B are exemplary tables summarizing data storage arrangement in the memory 230 in the video signal processing device 200 of FIG. 2 in accordance with two embodiments described herein. The exemplary tables in FIGS. 3A and 3B are shown in an example where the video signal processing device 200 conforms to the 625-line PAL standard. However, this is only for explanatory purposes and is not limited thereto. Similar descriptions can be analogized for video signal processing devices that conform to NTSC or other standards, but are omitted here for brevity.

For a frame in the PAL standard, the line numbers allowed to display data (i.e., visible on the display 270) range from 5 to 622. The other line numbers of 0-4 and 623-624 are located in a forbidden display region, and thus not visible on the display 270. Referring to FIG. 3A, the memory 230, in accordance with an embodiment herein can comprise a plurality of memory addresses equal to the number of teletext and video lines (i.e. 618 lines), wherein each memory address of the memory 230 can correspond to a respective text or video line. In a preferred embodiment, the memory addresses 0-617 can correspond sequentially to the line numbers 5-622 of the teletext lines and video lines respectively. Specifically, the "ith" address can correspond to the (i+5)th frame line, wherein i is an integer between 0 and 617.

In accordance with a preferred embodiment, for each memory address one portion of the memory can store the line enable signal 'LES' and the other portion can store the line data 'LD'. For example, the first byte of an address can be allocated to store the line enable signal 'LES' associated with a line number corresponding to the address, and the other successive bytes (e.g. 47 bytes) can be allocated to store the line data 'LD' associated with the same line number, as shown in the exemplary table.

Due to the sequential and one-to-one correspondence between the frame line numbers and the memory addresses, both the VBI controller 240 and the video controller 250 can sequentially (that is, in address order) read the memory 230 to acquire the enabled teletext line data 'LD_TTE' and the video line data 'LD_VIDEO', respectively. Specifically, in reading the memory 230, the VBI controller 240 can first detect if the current address corresponds to a teletext line or not. Only when the current address corresponds to a teletext line will the VBI controller 240 read the first byte of the current memory address; or otherwise, it skips to the detect the next line. If the current address is a teletext line, the VBI controller 240 then reads the first byte of the current address to detect the state of the teletext line. For example, if the value of the first byte is 1, meaning the teletext line is enabled, the VBI controller 240 can read the other 47 bytes of the same address and provide the read value to the TV encoder 260. Conversely, if the value of the first byte is 0, meaning the teletext line is disabled, then the VBI controller 240 can skip to read the next line.

On the other hand, in reading the memory 230, the video controller 250 can first detect if the current address corresponds to a video line or not. When the current address corresponds to a video line the video controller 250 can read the video line data 'LD_VIDEO' stored at the current memory address; otherwise, it can skip to the detect next line.

In FIG. 3A, the line numbers in the range of 5-22 or 317-334 in the PAL standard, are set as teletext line numbers, and the other line numbers (except in the forbidden display regions) are set as video line numbers. However, the embodiments described herein are not limited thereto. Because the memory 230 can have addresses for each teletext and video line, any video line can be changed to be a teletext line as long as that line is not required to transmit video information. In other words, at least one of the video lines is adaptable to serve as a teletext line for transmitting teletext information. For example, in FIG. 3B, the memory addresses 18-20, 310-311, and 330 (respectively corresponding to line numbers 23-25, 315-316, and 335) that are originally used as video lines in FIG. 3A can be adapted to serve as teletext lines for transmission of teletext information. Accordingly, the range of the teletext line numbers in the embodiment can have higher design flexibility and adoptability for diverse applications than the conventional technology in which not only the total number, but also the respective numbers of the teletext lines are restricted by the fixed disposed registers 140.

With the memory 230 dedicated to store not only the line data 'LD' but also the line enable data 'LES', the registers 142 can be removed. Thus, no large loading and latency are induced to the VBI controller 240, and higher teletext information processing efficiency is achieved. Additionally, because the memory 230 may have as many addresses as the total lines of a frame, the teletext lines can be set at any location in the entire frame. As a result, a more adaptable, flexible, and even broader range of the frame lines can be used for teletext information transmission than in the conventional technology with invariable teletext lines.

While certain embodiments have been described above, it will be understood that the embodiments described are by way of example only. Accordingly, the apparatus and methods described herein should not be limited based on the described embodiments. Rather, the apparatus and methods described herein should only be limited in light of the claims that follow when taken in conjunction with the above description and accompanying drawings.

What is claimed is:

1. A signal processing device configured to receive and encode a transport stream for display, wherein the transport stream provides teletext information associated with a plurality of teletext lines and video information associated with a plurality of video lines, the signal processing device comprising:

a memory configured to store line enable statuses and teletext line data respectively associated with the teletext lines, and video line data respectively associated with the video lines, wherein the memory includes a plurality of first memory regions where the line enable statuses and the teletext line data are stored, and a plurality of second memory regions where the video line data are stored, each of the first memory regions being assigned with a predetermined address in association with one teletext line and storing the line enable status and the teletext line data of the associated teletext line; and a VBI (vertical blanking interval) controller coupled to the memory, the VBI controller being configured to:
 detect which of the teletext lines is enabled based on the line enable status stored in each of the first memory regions; and
 read the teletext line data of each enabled teletext line.

2. The signal processing device of claim 1, wherein the memory has a total number of memory addresses which is equal to a total number of the teletext lines and the video lines in a frame.

3. The signal processing device of claim 1, further comprising a video controller coupled to the memory, the video controller being configured to read the video line data that are stored in the second memory regions.

4. The signal processing device of claim 3, further comprising:
 an encoder coupled to the VBI controller and the video controller, the encoder configured to receive and encode the teletext line data associated with the enabled teletext lines and the video data associated with the video lines for display.

5. The signal processing device of claim 1, further comprising:
 an encoder coupled to the VBI controller, the encoder being configured to receive and encode the teletext line data associated with the enabled teletext lines for display.

6. The signal processing device of claim 1, wherein at least one of the video lines is adaptable to serve as one teletext line for transmitting teletext information.

7. The signal processing device of claim 1, wherein the line enable status is stored in a first byte of each of the first memory regions.

8. A signal processing method for receiving and encoding a transport stream which provides teletext information associated with a plurality of teletext lines and video information associated with a plurality of video lines for display, the signal processing method comprising:
 storing line enable statuses and teletext line data respectively associated with the teletext lines in a plurality of first memory regions, and video data respectively associated with the video lines in a plurality of second memory regions, wherein each of the first memory regions is assigned with a predetermined address in association with one teletext line, and stores the line enable status and the teletext line data of the associated teletext line;
 detecting which of the teletext lines is enabled based on the line enable status stored in each of the first memory regions; and
 reading the teletext line data of each enabled teletext line.

9. The signal processing method of claim 8, wherein the memory has a total number of memory addresses which is equal to a total number of the teletext lines and the video lines in a frame.

10. The signal processing method of claim 8, further comprising reading the video line data associated with the video lines stored in the second memory regions.

11. The signal processing method of claim 10, further comprising:
encoding the teletext line data of the enabled teletext lines and the video line data of the video lines that are respectively read out from the first and second memory regions.

12. The signal processing method of claim 8, wherein after the step of reading the teletext line data of each enabled teletext line, the method further comprising:
encoding the teletext line data associated with the enabled teletext lines.

13. The signal processing method of claim 8, further comprising adapting at least one of the video lines for teletext information transmission.

14. The signal processing method of claim 8, wherein the line enable status is stored in a first byte of each of the first memory regions.

15. A signal processing device for processing a transport stream for display, the signal processing device comprising:
an extractor configured to extract from a received transport stream teletext information respectively associated with a plurality of teletext lines and video line data respectively associated with a plurality of video lines, the teletext information including line enable statuses and teletext line data respectively associated with each of the teletext lines;
a memory including a plurality of first memory regions where the teletext information is stored, and a plurality of second memory regions where the video data are stored, wherein each of the first memory regions stores the line enable status and the teletext line data associated with one teletext line, and each of the second memory regions stores the video line data associated with one video line; and
a VBI (vertical blanking interval) controller coupled to the memory, the VBI controller being configured to:
detect which of the teletext lines is enabled based on the line enable status stored in each of the first memory portions; and
read the teletext line data of each enabled teletext line.

16. The signal processing device of claim 15, wherein each of the first and second memory regions is respectively assigned with a different memory address, and the VBI controller is further configured to skip the memory addresses of the second memory regions when accessing the memory.

17. The signal processing device of claim 16, wherein a total number of the memory addresses is equal to a total number of the teletext lines and the video lines in a frame, and the VBI controller is configured to access the memory addresses sequentially.

18. The signal processing device of claim 15, wherein the line enable status is stored in a first byte of each of the first memory regions.

19. The signal processing device of claim 18, wherein when the first byte of one first memory region indicates that the associated teletext line is disabled, the VBI controller skips a remaining part of the first memory region that is associated with the disabled teletext line.

* * * * *